(12) United States Patent
Masteau et al.

(10) Patent No.: US 8,552,080 B2
(45) Date of Patent: Oct. 8, 2013

(54) POLYURETHANE FOAMS

(75) Inventors: Jean-Claude Masteau, Lyons (FR); Edson Leme Rodrigues, Pirassununga (ES)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 12/865,233

(22) PCT Filed: Jan. 22, 2009

(86) PCT No.: PCT/EP2009/050689
§ 371 (c)(1),
(2), (4) Date: Sep. 29, 2010

(87) PCT Pub. No.: WO2009/095348
PCT Pub. Date: Aug. 6, 2009

(65) Prior Publication Data
US 2011/0190406 A1    Aug. 4, 2011

(30) Foreign Application Priority Data
Feb. 1, 2008    (FR) ...................................... 08 00551

(51) Int. Cl.
*C08G 18/00* (2006.01)
*C07C 69/74* (2006.01)
*C07C 69/00* (2006.01)
*C07C 69/34* (2006.01)
*C07C 69/52* (2006.01)
*C07C 67/00* (2006.01)
*C07C 67/36* (2006.01)
*C07C 19/00* (2006.01)
*C07C 303/00* (2006.01)

(52) U.S. Cl.
USPC ............... 521/172; 521/170; 560/1; 560/127; 560/129; 560/190; 560/204; 562/822

(58) Field of Classification Search
USPC .............. 521/170, 172; 560/1, 127, 129, 190, 560/204; 562/822
See application file for complete search history.

(56) References Cited

U.S. PATENT DOCUMENTS

| | | | |
|---|---|---|---|
| 4,243,755 A * | 1/1981 | Marx et al. ....................... 521/99 |
| 4,778,830 A | 10/1988 | Streu et al. | |
| 5,587,056 A | 12/1996 | Denis et al. | |
| 2003/0225201 A1 * | 12/2003 | Yamana et al. ................ 524/589 |
| 2007/0161731 A1 | 7/2007 | Carvalho et al. | |
| 2009/0326260 A1 | 12/2009 | Leconte et al. | |

FOREIGN PATENT DOCUMENTS

| | | |
|---|---|---|
| EP | 0271789 A2 | 6/1988 |
| EP | 0687663 B1 | 12/1995 |
| FR | 2858622 A1 | 2/2005 |
| WO | WO 2007/141404 A1 | 12/2007 |

* cited by examiner

*Primary Examiner* — Melissa Rioja
(74) *Attorney, Agent, or Firm* — Dentons US LLP

(57) ABSTRACT

Polyurethane foams are prepared from polyester polyols obtained by reaction of diols with a mixture of diacids derived from a mixture of dinitrile compounds obtained as by-products in the manufacture of adiponitrile by hydrocyanation of butadiene.

18 Claims, No Drawings

POLYURETHANE FOAMS

CROSS-REFERENCE TO PRIOR APPLICATIONS

This application claims priority under 35 U.S.C. §119 of FR 0800551, filed Feb. 1, 2008, and is a continuation of PCT/EP 2009/050689, filed Jan. 22, 2009 and designating the United States (published in the French language on Aug. 6, 2009, as WO 2009/095348 A1; the title and abstract were also published in English), each hereby expressly incorporated by reference in its entirety and each assigned to the assignee hereof.

The present invention relates to polyurethane foams prepared from polyester polyols obtained by polymerization of diol monomers and diacid monomers, the latter being synthesized from a mixture of dinitrile compounds obtained as by-products in the manufacture of adiponitrile by hydrocyanation of butadiene.

Polyurethane foams are used in many applications. Mention may be made, by way of example, of the manufacture of soles for shoes, and also internal soles or mid-soles.

According to the applications of these foams, they have to exhibit predetermined properties which require the use of specific starting materials for the synthesis of the polyester polyols and polyisocyanates. Thus, the polyurethane foams used in particular in the field of footwear are often obtained by using, as base products, polyester polyols synthesized from diol monomers, such as glycol or diethylene glycol, and diacid monomers, such as adipic acid. For other uses, it is also possible to make use of the polyester polyols obtained from diacid monomers composed of a mixture of diacids, namely adipic acid, glutaric acid and succinic acid. This mixture of diacids is a by-product obtained in the processes for the manufacture of adipic acid by oxidation of cyclohexane.

There still exists a need to find novel compounds or products for manufacturing polyurethanes and in particular polyurethane foams in order to obtain foams with novel properties and/or to widen the list of starting materials capable of producing polyurethane foams with properties suitable for the known applications.

The manufacture of adiponitrile, a major chemical intermediate used in particular in the synthesis of hexamethylenediamine and caprolactam (monomers for the manufacture of polyamides), by hydrocyanation of butadiene generates a stream of dinitrile by-products comprising predominantly branched dinitrile compounds, such as 2-methylglutaronitrile or ethylsuccinonitrile. This mixture of branched dinitrile compounds is obtained by distillation in order to separate it from adiponitrile. As the separation cannot be complete, the mixture of branched dinitrile compounds also comprises a small proportion of adiponitrile.

Several solutions have been proposed for giving added value to these by-products or mixtures. One of these consists in hydrogenating the dinitrile compounds to give primary amines, in particular in order to produce methylpentamethylenediamine (MPMD), used as monomer in the manufacture of specific polyamides. This process requires stages of purification, either of the methylglutaronitrile or of the methylpentamethylene-diamine.

In industry, these by-products are also given added value in the form of steam or of energy by combustion. However, this combustion can require a treatment of the gases in order to remove the nitrogen oxides produced and produces carbon dioxide gas, which is discharged to the atmosphere.

There thus exists a significant demand and a need to find novel ways of giving added value to and converting these dinitrile compounds or mixtures to give chemical compounds which can be put to use and which are economically advantageous.

Unless otherwise mentioned, the percentages and parts given in the text below are expressed by weight.

One of the aims of the present invention is specifically to provide a polyurethane foam prepared from polyester polyols which are obtained with starting materials resulting from the conversion of the mixture of abovementioned branched dinitrile compounds. These polyurethane foams have properties comparable to those of the polyurethane foams of the prior art.

To this end, the invention provides a process for the preparation of polyurethane foam obtained by reaction between:
a) at least one polyisocyanate and
b) at least one polyester polyol produced by polymerization of diol monomers and diacid monomers, the diacid monomers comprising at least one mixture of diacids, referred to hereinafter as mixture M, the composition by weight of which is:

| | |
|---|---|
| methylglutaric acid (MGA): | 50-99% |
| ethylsuccinic acid (ESA): | 0-30% |
| adipic acid (AA): | 0-50%. |

The invention is also targeted at the polyurethane foams thus prepared.

In the mixture of diacids used as diacid monomers, all or part of said diacids can be in the form of anhydrides.

Preferably, the mixture of diacids or mixture M exhibits the following composition by weight: methylglutaric acid (MGA): 75-95%, advantageously 80-95% ethylsuccinic acid (ESA): 0-12%, advantageously 0-10% adipic acid (AA): 0-20%, advantageously 5-15%.

The diacid monomers used for the synthesis of the polyester polyol can also comprise other diacids, such as adipic acid, phthalic acids, the mixture of glutaric/succinic/adipic acids resulting from the manufacture of adipic acid, or the like.

According to the invention, the above mixture M is obtained by conversion of a mixture of dinitrile compounds, referred to hereinafter as mixture N, to give acids by hydrolysis of the nitrile functional groups. This mixture N of dinitrile compounds is advantageously a mixture of branched dinitrile compounds separated and recovered in the process for the manufacture of adiponitrile by double hydrocyanation of butadiene.

Thus, by way of example, this mixture N comprises:

| | |
|---|---|
| 2-methylglutaronitrile (MGN): | from 80 to 85% |
| ethylsuccinonitrile (ESN): | from 8 to 12% |
| adiponitrile (AdN): | from 3 to 5% |

The remainder to 100% corresponds to various impurities.

The mixture of diacids is prepared by conversion of the compounds constituting the mixture N of dinitriles. This conversion can be carried out by several processes. By way of example, two processes are briefly described below.

According to a first process, the conversion of the nitrile functional groups to carboxyl functional groups is obtained by reaction of the nitrile compounds with a basic hydroxyl compound in solution in a solvent at a temperature of between 80 and 200° C., preferably between 80 and 150° C. The ammonia formed is removed. The salt obtained is reacted with an inorganic acid and the diacids formed are isolated and recovered. Such a process is, for example, described in French application No. 2 902 095. The basic hydroxyl compound is an alkali metal hydroxide, such as sodium hydroxide, potassium hydroxide or the like. Advantageously, an aqueous solution of this basic hydroxyl compound is used. The concentration of basic compounds in the aqueous solution is advantageously between 5 and 30% by weight. The basic hydroxyl compound is employed with an excess of 3 to 20%, advantageously between 3 and 10%, with respect to the stoichiometric amount necessary to convert the nitrile functional groups to carboxyl functional groups. The reaction is carried out either at atmospheric pressure at, advantageously, a temperature which makes it possible to have reflux of the solvent, for example water, or under pressure with removal of the ammonia formed or without removal of this ammonia formed, which will be at least partially dissolved in the reaction medium. Mention may be made, as suitable inorganic acid, of sulfuric acid, hydrochloric acid, organic acids exhibiting a pKa of less than or equal to 3, or their mixtures.

It is also possible to obtain the dicarboxylic acids constituting the mixture M according to another process for the conversion of the nitrile functional groups to acid functional groups. This process consists in hydrating the nitrile functional groups of the compounds forming the mixture N, in order to form amide compounds, and in hydrolyzing the amide functional groups to give carboxyl functional groups, as described in unpublished French patent application No. 06 10302, filed on 24 Nov. 2006.

Briefly, according to this process, the mixture M of diacids is prepared by:
a) hydrating a corresponding mixture N comprising methylglutaronitrile (MGN), ethylsuccinonitrile (ESN) and adiponitrile (AdN) to give amide functional groups, and
b) hydrolyzing the amide functional groups to give carboxyl functional groups.

The hydration stage is carried out by reaction with water in the presence of a strong inorganic acid, by using from 1 to 1.5 mol of water per mole of nitrile functional group to be hydrated in the presence of a strong inorganic acid at a temperature which makes it possible to maintain the reaction medium in the liquid state. The hydrolysis stage is carried out, with stirring, by using from 1 to 10 mol of water per mole of amide functional group to be hydrolyzed and an amount of strong inorganic acid, expressed in protons, corresponding to at least 1 mol of proton per mole of amide to be hydrolyzed, the temperature of the reaction medium being determined in order to maintain the reaction medium in the liquid state. The dicarboxylic acid formed is recovered by maintaining the reaction medium, without stirring, at a temperature greater than the melting point of the dicarboxylic acid and/or of the salt formed for separation by settling of the reaction medium, the upper phase comprising the carboxylic acid being separated.

The dicarboxylic acids thus obtained by these various processes are advantageously purified by the usual techniques, namely crystallization, distillation, refining or the like.

It is also possible to treat this mixture of diacids by processes which make it possible to separate some diacids and thus to modify the composition by weight of the mixture obtained by the processes for the conversion of dinitrile compounds described above. Thus, a process for the separation of diacides described in European patent 0 687 663 can be used. It consists in converting the diacids into the anhydride form and then separating the anhydrides by distillation. By the use of this process, it is possible to separate in particular the anhydride of ethylsuccinic acid and/or the anhydride of adipic acid and to recover a mixture comprising a high concentration of anhydride of methylglutaric acid. This mixture can be used as is or after reformation of the acid form.

The polyester polyols are obtained, for example, according to a manufacturing process comprising two stages, a first stage of esterification and a second stage of polycondensation.

The esterification stage is carried out by mixing the diacids of the mixture M with polyols, preferably diols and/or polyether diols, such as, for example, a mixture of ethylene glycol and diethylene glycol, with a diol/diacid molar ratio of between 1.2 and 1.5.

The suitable diols are chosen from the group consisting of ethylene glycol, 1,4-butanediol, 1,5-pentanediol, 1,6-hexanediol, 1,10-decanediol, 2,2-dimethyl-1,3-propanediol, 1,3-propanediol, trimethylpropanol and bisphenol, the polyether diols being chosen from the group consisting of diethylene glycol, dipropylene glycol and 1,1,3-trimethyltriethylenediol.

The reaction temperature in this first stage is gradually increased during the progression of the reaction. By way of example, the start of the reaction is carried out at a temperature of 160° C. to arrive at a temperature of 220° C. at the end of the reaction.

The second stage of polycondensation is carried out with addition of a catalyst, such as tetrabutyl titanate (TBT), with a concentration by weight of 0.003%, with respect to the weight of diacids involved. The polymerization temperature is 200° C. under a pressure of between 10 and 20 mbar.

The polyester polyol obtained is characterized by the hydroxyl number ($I_{OH}$), corresponding to the number of mg of potassium hydroxide per gram of polyol to convert the hydroxyl functional groups to alkoxide functional groups, and the acid number ($I_A$), which represents the number of mg of KOH necessary to neutralize 1 g of polyol.

The polyester polyol is also characterized by the viscosity and by its molecular weight.

Advantageously, an additive which limits or prevents the hydrolysis of the ester functional groups is added to the polyester polyols, such as carboimides, for example cyanamides; hydrogen cyanamide; carbimides; cyanogenamides; amidocyanogens.

It can also be advantageous to add, to the polyester polyols, additives which stabilize against UV radiation, such as hindered amines, antioxidants, flame retardants or the like.

It can be advantageous, in order to modify the mechanical properties of the polyurethane foams, to add a dispersed particulate inorganic filler.

Mention may be made, as suitable particulate inorganic fillers, by way of example, of the fillers exhibiting particles with a size of less than 60 µm, preferably of less than 20 µm and more advantageously still of less than 10 µm.

Thus, mention may be made, as suitable fillers, of powders formed of aluminosilicate, of silica, in particular obtained by precipitation, of titanium oxides, of talc, of kaolin or of calcium carbonate, for example.

According to a preferred embodiment, these inorganic fillers are present in a dispersed manner in the polyester polyol before reacting with the polyisocyanate. This dispersion of the inorganic filler can be obtained by addition of the latter to the polyester polyol or to the medium for polymerization of the polyester polyol. It is also possible to disperse the inorganic filler in the polyol monomer before the addition to the process for the manufacture of the polyester polyol. More advantageously still, the inorganic filler can be mixed with the mixture M of diacids before feeding to the polymerization process.

The amount of inorganic filler in the suspension in the polyol, the polyester polyoly or as a mixture with the diacids is chosen according to the concentration of inorganic filler desired in the polyurethane foam. Thus, concentrations between 1 and 80% by weight of filler in the mixture with the diacids can be used.

The polyurethanes of the invention are obtained according to the conventional and normal processes. Thus, the polyester polyols of the invention are mixed with optionally a chain-extending agent and the polyisocyanate in the presence of a foam-forming or blowing agent and a catalyst.

Use may be made, as foam-forming agent, of water, hydrocarbons, chlorofluorocarbons or hydrofluorocarbons, alone or as a mixture. Water is the preferred foam-forming or blowing agent.

Mention may be made, as catalysts suitable for the invention, of tertiary amines, such as 1,4-diazabicyclo[2.2.2]octane, N,N,N',N'-tetramethylhexa-methylenediamine, N,N,N',N'-tetramethylpropylene-diamine, N,N,N',N',N''-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazines, N,N,N',N'-tetra-methylethylenediamine, N,N-diethylbenzylamine, bis(N,N-diethylaminoalkyl) adipate, N,N,N',N'-tetramethyl-1,3-butanediamine, N,N-dimethyl-β-phenylethyldiamine, 1,2-dimethylimidazole, 2-methylimidazole and the like. Other catalysts can be used, such as organometallic compounds, for example dibutyltin dilaurate, tin oleate, cobalt naphthenate or lead naphthenate.

Other additives, such as regulators of the size and shape of the cells, pigments, coloring agents or antioxidants, can be added.

The mixture is injected into a mold in order to form the polyurethane foam and to obtain an article with the desired shape, such as soles, for example.

By adjusting the amount of foam-forming agent, for example the amount of water, it is possible to obtain foams with different densities, for example of between 0.1 and 0.9 g/cm$^3$, advantageously of between 0.2 and 0.5 g/cm$^3$.

The polyurethane foams of the invention make it possible to produce articles exhibiting suitable properties similar to those of the polyurethane foams of the prior art, in particular those obtained with polyester polyols produced from diol monomers and adipic acid. These properties are illustrated in the following examples.

Among these properties, the tensile strength, determined according to the standard DIN 53543, the elongation at break, measured according to the standard DIN 53543, and the tear strength, measured according to the standard ASTM D3574-95, are important.

Other properties are also important for certain applications. Thus, the abrasion resistance is determined according to the standard DIN 53516. The shrinkage during molding is measured according to the standard ASTM D3851, the compression set (CS) is measured according to the standard ASTM D395 and the resilience is measured according to the standard ASTM D1054.

The advantages and details of the invention will become apparent in more detail in the light of the examples given below by way of indication and without implied limitation.

Preparation of Diacids from a Mixture N of Dinitriles by Basic Hydrolysis 108 g of a mixture N of dinitrile compounds originating from the process for the manufacture of adiponitrile by hydrocyanation of butadiene are added over 30 min with stirring to 560 g of a 15% aqueous sodium hydroxide solution heated beforehand to 80° C.

The mixture N of dinitrile compounds has the following composition by weight:

| | |
|---|---|
| methylglutaronitrile (MGN): | 84.2% |
| ethylsuccinonitrile (ESN): | 11% |
| adiponitrile (AdN): | 4% |

The remainder to 100% corresponds to various impurities.

The mixture is subsequently heated in order to obtain a reflux and is maintained at this temperature for approximately 7 h. The ammonia which is given off is recovered and trapped. The progress of the reaction is monitored by potentiometric titration with a hydrochloric acid solution. This titration makes it possible to determine the amount of sodium hydroxide remaining, the amount of dissolved ammonia and the amount of salified carboxyl functional group corresponding to the various jumps of pH observed during the titration. The reaction medium is subsequently cooled to ambient temperature and 80 g of water are added before running in 105 g of 98% sulfuric acid. The pH of the aqueous solution is of the order of 3.

The aqueous phase is subsequently extracted with 3 times 200 ml of MTBE (methyl tert-butyl ether) at 40° C. The organic phases are combined and the MTBE is subsequently distilled off. 141.6 g of diacids are obtained with a purity, determined by potentiometric titration, of the order of 98.5%.

The mixture of diacids obtained is distilled in a batchwise distillation. After removal of the first top fractions comprising volatile compounds, the first fractions comprising methylglutaric acid and ethylsuccinic acid are combined in order to form a first example used to carry out example 1, the combination of the intermediate fractions is used to carry out example 2 and the final fractions form a third mixture comprising a higher proportion of adipic acid used to carry out example 3.

A second batch of mixture of diacids was manufactured according to the above procedure. A portion of the mixture obtained after extraction of the MTBE solvent was distilled in a continuous distillation; the distilled fraction, after removal of the volatile compounds, was used to carry out example 4 while the other undistilled portion of the mixture of diacids was used to carry out example 5.

The compositions by weight of the various mixtures of diacids described above are shown in table 1 below:

TABLE 1

| Components | Ex. 1 | Ex. 2 | Ex. 3 | Ex. 4 | Ex. 5 |
|---|---|---|---|---|---|
| Methylglutaric acid, % by weight | 91.5 | 93 | 85 | 87.9 | 87.9 |
| Ethylsuccinic acid, % by weight | 8.5 | 0 | 0 | 7.6 | 7.6 |
| Adipic acid, % by weight | 0 | 7 | 15 | 4.5 | 4.5 |

Preparation of the Polyester Polyol

The mixtures of diacids defined above in the table are esterified by addition of a mixture of MEG and DEG glycols according to an MEG/DEG molar ratio of 60/40, the glycol/diacid molar ratio being 1.30. After esterification, the polymerization reaction is carried out, after addition of 0.03 g/kg of tin catalyst, at approximately 200° C. for approximately 13 h.

The 5 polyester polyols obtained have the physicochemical characteristics collated in table 2 below:

TABLE 2

| Polyester polyol | Ex. 1 | Ex. 2 | Ex. 3 | Ex. 4 | Ex. 5 |
|---|---|---|---|---|---|
| Reaction time (h) | 13.3 | 14.9 | 15.1 | 19.4 | 15.2 |
| Yield (g polyester polyol/g acid | 1.43 | 1.40 | 1.42 | 1.33 | 1.34 |
| Hydroxyl number (mg KOH/g) | 58.7 | 57.5 | 58.9 | 65.9 | 59.4 |
| Acid number (mg KOH/g) | 0.60 | 1.0 | 0.58 | 0.15 | 0.47 |
| Content of water (%) | 0.04 | 0.04 | 0.06 | 0.05 | 0.06 |
| Viscosity, mPa · s, at 35° C. | 3540 | 3252 | 3306 | 2927 | 3384 |

Preparation of the Polyurethane Foams

The polyurethane foams are obtained from the 5 polyester polyols described above in table 2 (examples 1 to 5) and by mixing the products listed in table 3 below, by injection of these products into an injection molding machine and forming in a mold according to the conditions shown in table 4. The NCO/OH molar ratio is 1.02 for the polyol of example 1, 1.00 for the polyol of example 2, 0.98 for the polyol of example 3, 0.99 for the polyol of example 4 and 0.96 for the polyol of example 5.

TABLE 3

|  | Parts by weight | % by weight |
|---|---|---|
| Polyol | 100 | 88.73 |
| MEG | 10 | 8.87 |
| Water | 0.8 | 0.71 |
| Dabco DC 1027* | 0.56 | 0.50 |
| Dabco EG* | 0.84 | 0.75 |
| Dabco DC 3043* | 0.3 | 0.27 |
| Dabco DC 3042* | 0.2 | 0.18 |
| Isocyanate prepolymer, sold under the name Elastopan SP 8020 by BASF (% NCO = 20.8) | | |

*Products sold by Air Products & Chemicals

TABLE 4

| Temperature of the polyol | 40° C. |
|---|---|
| Isocyanate prepolymer temperature | 35° C. |
| Rotation of the head mixer (rpm) | 7700 |
| Molding temperature | 50° C. |
| Density of the molding | 0.45 g/cm$^3$ |
| Removal time | 4 min |

The properties of the polyurethane foams obtained are determined according to the standardized methods described above and are collated in table 5 below:

TABLE 5

|  | Ex. 1 | Ex. 2 | Ex. 3 | Ex. 4 | Ex. 5 |
|---|---|---|---|---|---|
| Tensile strength kgf/cm$^2$ (DIN 53543) | 52.9 | 45.6 | 49.7 | 50.8 | 56.2 |
| Tensile strength kgf/cm$^2$ (DIN 53543) after 7 days at 70° C. | 52.3 ± 5.7 | 44.2 ± 2.7 | 55.8 ± 2.6 | | |
| Elongation kgf/cm$^2$ (DIN 53543) | 297 | 326 | 291 | 289 | 310 |
| Tear strength kgf/cm$^2$ (ASTM D3574-95) | 14.4 | 16.9 | 14.5 | 16.7 | 19.3 |
| Abrasion (DIN 53516 force 10N) | 380/353 | 310/336 | 280/302 | | |
| Abrasion (DIN 53516 force 5N) | 108 ± 20 | 103 ± 30 | 75 ± 10 | 116 ± 20 | 97 ± 5 |
| CS (ASTM D-395) (%) | 15-25 | 15-25 | 10-20 | 12-15 | 8-11 |
| Resilience (ASTM D1054) (%) | 22 | 26 | 25 | 13 | 12 |
| Bending fatigue test (cycles) | >150 000 | >150 000 | >150 000 | | |
| Initial hardness (DIN 53545) | 44 ± 1 | 53 ± 2 | 47 ± 1 | | |
| Hardness after 7 days at 70° C. (DIN 53545) | 43 ± 0 | 44 ± 1.5 | 46 ± 1 | 52 ± 1.3 | 51.8 ± 1 |

Table 5 reveals that the 5 polyurethane foams prepared from polyester polyols in accordance with the invention (examples 1 to 5) exhibit a level of physical properties which are high and comparable with those of the polyurethane foams normally used in industry, in particular in the footwear industry.

The invention claimed is:

1. A polyurethane foam which comprises the reaction product of:
   a) a polyisocyanate with
   b) a polyester polyol obtained by polymerization of a mixture of polyol monomers and diacid monomers, said diacid monomers comprising at least one mixture M of diacids having the following composition by weight:

| | |
|---|---|
| methylglutaric acid (MGA): | 80-95% |
| ethylsuccinic acid (ESA): | 0-10% |
| adipic acid (AA): | 5-15%. |

2. The polyurethane foam as defined by claim 1, wherein the diacids of the at least one mixture M are partially or completely in the anhydride form.

3. The polyurethane foam as defined by claim 1, wherein the polyol monomers are selected from the group consisting of diols and polyether diols.

4. The polyurethane foam as defined by claim 1, wherein the at least one mixture M of diacids is obtained from a mixture N comprising 2-methylglutaronitrile (MGN), ethylsuccinonitrile (ESN) and adiponitrile (AdN) by reaction with a basic hydroxyl compound in solution in a solvent at a temperature ranging from 80 to 200° C., removal of the ammonia thus formed and reacting the salt obtained with an inorganic acid.

5. The polyurethane foam as defined by claim 1, wherein the at least one mixture M of diacids is prepared in a reaction medium by:
   a) hydrating a mixture N comprising 2-methylglutaronitrile (MGN), ethylsuccinonitrile (ESN) and adiponitrile (AdN) to provide amide functional groups, and
   b) hydrolyzing the amide functional groups to provide dicarboxylic acids.

6. The polyurethane foam as defined by claim 5, wherein said hydrating is carried out by reaction with water in the presence of a strong inorganic acid, employing from 1 to 1.5 mol of water per mole of nitrile functional group to be hydrated in the presence of a strong inorganic acid, at a temperature which maintains the reaction medium in the liquid state.

7. The polyurethane foam as defined by claim 5, wherein said hydrolyzing is carried out, under stirring, employing from 1 to 10 mol of water per mole of amide functional group to be hydrolyzed and an amount of strong inorganic acid, expressed in protons, corresponding to at least 1 mol of proton per mole of amide to be hydrolyzed, the temperature of the reaction medium being such as to maintain the reaction medium in the liquid state.

8. The polyurethane foam as defined by claim 5, wherein the dicarboxylic acids formed are recovered by maintaining the reaction medium, without stirring, at a temperature greater than the melting point of the diacids and/or salts formed to permit the separation by settling of the reaction medium, the upper phase comprising the diacids being separated.

9. The polyurethane foam as defined by claim 4, wherein the mixture N of dinitrile compounds comprises a mixture resulting from the production of adiponitrile by double hydrocyanation of butadiene.

10. The polyurethane foam as defined by claim 1, wherein said polyol monomers are selected from the group consisting of ethylene glycol, 1,4-butanediol, 1,5-pentanediol, 1,6-hexanediol, 1,10-decanediol, 2,2-dimethyl-1,3-propanediol, 1,3-propanediol, trimethylpropanol and bisphenol.

11. The polyurethane foam as defined by claim 1, wherein said polyol monomers are selected from the group consisting of diethylene glycol, dipropylene glycol and 1,1,3-trimethyltriethylenediol.

12. The polyurethane foam as defined by claim 1, comprising a dispersed particulate inorganic filler.

13. The polyurethane foam as defined by claim 12, said dispersed particulate inorganic filler comprising particles having a size of less than 60 μm.

14. The polyurethane foam as defined by claim 13, said dispersed particulate inorganic filler comprising particles having a size of less than 20 μm.

15. The polyurethane foam as defined by claim 14, said dispersed particulate inorganic filler comprising particles having a size of less than 10 μm.

16. The polyurethane foam as defined by claim 12, said dispersed particulate inorganic filler comprising powders formed of aluminosilicate, of silica, of titanium oxide, of talc, of kaolin or of calcium carbonate.

17. A molded shaped article comprising the polyurethane foam as defined by claim 1.

18. A shoe sole comprising the polyurethane foam as defined by claim 1.

* * * * *